United States Patent
Otsuka et al.

(10) Patent No.: US 6,650,075 B2
(45) Date of Patent: Nov. 18, 2003

(54) FAN MOTOR

(75) Inventors: Motoi Otsuka, Kiryu (JP); Koji Kataoka, Kiryu (JP)

(73) Assignee: Japan Servo Co., Ltd., Tokyo (JP)

( * ) Notice: Subject to any disclaimer, the term of this patent is extended or adjusted under 35 U.S.C. 154(b) by 0 days.

(21) Appl. No.: 10/186,948

(22) Filed: Jul. 2, 2002

(65) Prior Publication Data

US 2003/0006725 A1 Jan. 9, 2003

(30) Foreign Application Priority Data

Jul. 6, 2001 (JP) ......................................... 2001-205676
Jul. 6, 2001 (JP) ......................................... 2001-205677

(51) Int. Cl.[7] ............................... H02P 5/00; H02P 7/00
(52) U.S. Cl. ......................................... 318/268; 318/434
(58) Field of Search ............................... 318/268, 138, 318/254, 439, 66, 68, 434, 490; 388/903

(56) References Cited

U.S. PATENT DOCUMENTS

| | | | | |
|---|---|---|---|---|
| 3,794,894 A | * | 2/1974 | Van Leer | 318/702 |
| 4,766,359 A | * | 8/1988 | Smith et al. | 318/652 |
| 5,166,585 A | * | 11/1992 | Koharagi et al. | 318/254 |
| 5,255,148 A | * | 10/1993 | Yeh | 361/94 |
| 5,448,143 A | * | 9/1995 | Pecone | 318/434 |
| 5,714,854 A | * | 2/1998 | Mizuta et al. | 318/266 |
| 6,040,673 A | * | 3/2000 | Isomura et al. | 318/615 |
| 6,124,581 A | * | 9/2000 | Ulrich | 219/665 |
| 6,166,503 A | * | 12/2000 | Korbel et al. | 318/434 |
| 6,271,637 B1 | * | 8/2001 | Kushion | 318/434 |
| 6,310,453 B1 | * | 10/2001 | Lin | 318/445 |
| 6,326,758 B1 | * | 12/2001 | Discenzo | 318/609 |
| 6,385,395 B1 | * | 5/2002 | Horng et al. | 318/809 |

* cited by examiner

Primary Examiner—Robert E. Nappi
Assistant Examiner—Patrick Miller
(74) Attorney, Agent, or Firm—Birch, Stewart, Kolasch & Birch, LLP

(57) ABSTRACT

A self-diagnosis device is provided with a fan motor having a stator on which a stator coil is mounted, a rotor having a permanent magnet and a fan, a Hall device for detecting magnetic pole position of the permanent magnet and a current control device for controlling rotation of the rotor by controlling current fed to the stator coil. The self-diagnosis device judges if the fan motor has exceeded its service life. Further, the self-diagnosis device interrupts the current fed to the stator coil when the rotational speed is higher than an allowable value, and restarts the current automatically to return the fan motor into normal operation when the rotational speed is not higher than the allowable value.

4 Claims, 4 Drawing Sheets

FAN MOTOR

BACKGROUND OF THE INVENTION

1. Field of the Invention

The present invention relates to a fan motor, and more particularly to a fan motor provided with a self-diagnosis feature.

2. Description of the Prior Art

A fan motor being used in the background art includes a stator, a rotor, a Hall device, a microcomputer and a current control circuit. The stator has a stator coil mounted on it. The rotor includes a permanent magnet and a fan, and is rotatably supported to oppose the stator coil. The Hall device detects a magnetic pole position of the permanent magnet. The microcomputer processes the output of the Hall device. The current control circuit receives the output of the microcomputer and controls the operation of the rotor by controlling current to be fed to the stator coil.

Such a fan motor is installed, for example, in a casing of electronic equipment, and is an important component that discharges heat inside of the casing to assure the safe operation of the electronic equipment. Accordingly, the operating or service life of the fan motor has an important effect on the operating lives of the electronic equipment in the casing in which the fan motor is installed.

An operating life of a fan motor is estimated based on results of continuous running tests for a large number of samples. However, there is a problem that it is difficult to exactly determine a service life of an individual fan motor actually in use, based only on the results of the continuous running tests using samples, since service lives of fan motors vary according to the individual service conditions.

Further, some fan motors are provided with protection circuits. The protection circuit detects the rotational speed of the fan motor from an output voltage of the Hall device, determines that the fan motor is incurring an overload when the detected rotational speed is lower than the reference value and stops the fan motor. However, there is a problem that such a protection circuit does not work as a protection device in the abnormal case when the rotational speed of the fan motor exceeds an allowable value for some reason, and a voltage induced in the stator coil exceeds the voltage capacity of a semiconductor device in a current control circuit.

SUMMARY OF THE INVENTION

It is an object of the present invention to solve the above problems and provide a fan motor provided with a self-diagnosis device or function.

It is another object of the present invention to provide a fan motor provided with a self-diagnosis device or function that determines if the fan motor has exhausted its service life.

It is still another object of the present invention to provide a fan motor provided with a self-diagnosis device or function that provides protection for control circuit devices.

One or more of these and other objects are accomplished by a fan motor comprising a stator on which a stator coil is mounted; a rotor comprising a permanent magnet and a fan and being rotatably supported to oppose said stator coil; a Hall device for detecting a magnetic pole position of said permanent magnet; current control means for controlling rotation of said rotor by controlling current to be fed to said stator coil; and self-diagnosis means for detecting the state of said fan motor, wherein an operation of said fan motor is controlled through said current control means based on a result from said self diagnosis means, wherein said self-diagnosis means includes a current detection circuit for detecting an instantaneous current value in said stator coil, current signal processing means for processing said instantaneous current value, and memory means for processing and storing a steady state current value, said instantaneous current value being compared with said steady state current value for determining if said fan motor has exceeded a service life of said fan motor if a difference between said instantaneous current value and said steady state current value exceeds a predetermined value, wherein said current signal processing means further includes zero timing generator means for receiving an output voltage from said Hall device and for generating a zero timing signal, timing signal generator means for receiving said zero timing signal and for generating a timing signal, sampling means for receiving said timing signal and for sampling said currently flowing current value, A/D converter means for transforming said sampled currently flowing current value into a digital value, and comparator means for comparing, at any time starting from receipt of said zero timing signal, said digital value of said instantaneous current value with a digital value of said steady state current value stored in said memory device, and said fan motor is determined to have exceeded the service life if the difference between said digital value of said instantaneous current value and said digital value of said steady state current value exceeds the predetermined value.

This fan motor is capable of being controlled autonomously, since the self-diagnosis device detects the state of the fan motor, based on the result of which the operation of the fan motor is controlled through the current control device.

Further to achieve the above object, the self-diagnosis device includes a current detection circuit for detecting a currently flowing current value in the stator coil, a current signal processing means for processing the currently flowing current value, and a memory means for processing and storing a steady state current value, in which the currently flowing current value is compared with the steady state current value, and the fan motor is judged to have exceeded the service life if the difference between the instantaneous current value and the steady state current value exceeds a predetermined value.

The fan motor provided with the above-described self-diagnosis device can be replaced properly when the service life of the fan motor has been exhausted, and consequently, the service lives of the electronic equipment for which the fan motor is provided can be increased, since the instantaneous current value is compared with the steady state current value, and the fan motor is judged to have exhausted its service life if the difference between the instantaneous current value and the steady state current value exceeds a predetermined value.

One or more of these and other objects are accomplished by a fan motor comprising a fan motor comprising a stator on which a stator coil is mounted; a rotor including a permanent magnet and a fan and being rotatably supported to oppose said stator coil; a Hall device for detecting a magnetic pole position of said permanent magnet; current control means for controlling rotation of said rotor by controlling current fed to said stator coil; and self-diagnosis means for detecting the state of said fan motor, wherein an operation of said fan motor is controlled through said current control means based upon a result of said self-diagnosis means, wherein said self-diagnosis means further includes reference voltage generator means for generating a predetermined reference voltage, F/V converter means for transforming a rotational speed detected by use of an output voltage of said Hall device into a voltage proportional to said rotational speed, and comparator means for comparing said reference voltage with said voltage proportional to said rotational speed, wherein said current fed to said stator coil is interrupted when said voltage proportional to said rotational speed is higher than said reference voltage, and said current fed to said stator coil is cut-off and automatically restarted to return said fan motor into normal operation when said voltage proportional to said rotational speed is less than or equal to said reference voltage.

The fan motor provided with such a self-diagnosis device can be prevented from an accident in which a semiconductor device in the current control means is destroyed, since when the rotational speed of the fan motor becomes higher than an allowable value, the current fed to the stator coil is interrupted, the rotational speed of the rotor is lowered and a voltage induced in the stator coil is kept below the voltage capacity of the semiconductor device in the current control device.

Other objects, characteristics and advantages of the present invention will become apparent from the following detailed description referring to the attached drawings. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1:
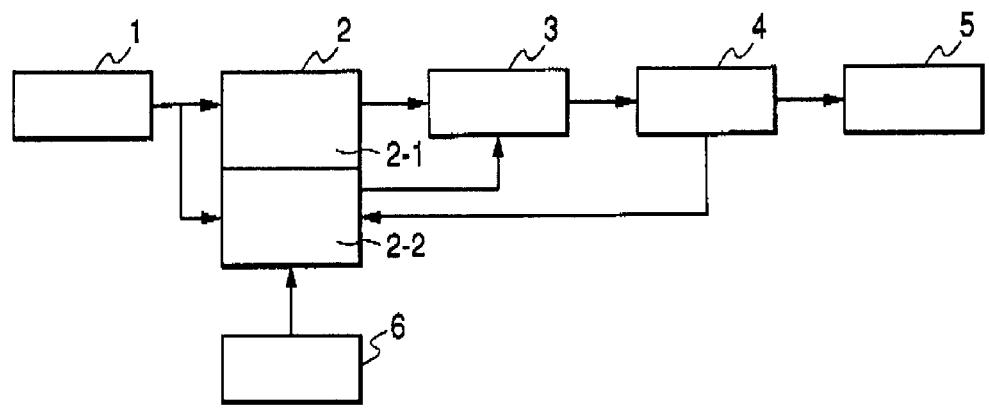
FIG. 1 is a block diagram of a control system of the first embodiment of the fan motor according to the present invention.

Preferred embodiments of the fan motor according to the present invention are explained referring to the attached drawings. FIG. 1 is a block diagram of a control system of the first embodiment of the fan motor according to the present invention. In the drawing, 1 is a Hall device, 2 is a microcomputer containing a current signal processing device 2-2, 3 is a current control circuit that is a current control device, 4 is a current detection circuit, 5 is a stator coil and 6 is a memory device.

A magnetic pole position signal of a permanent magnet of a rotor detected by the Hall device 1 is transmitted into a current control signal generator part 2-1 in the microcomputer 2. The current control signal generator part 2-1 processes the input magnetic pole position signal and transmits the resultant signal into the current control circuit 3. An output of the current control circuit 3 is transmitted into the stator coil 5 through the current detection circuit 4. Thus, a current, controlled based on the output of the Hall device 1, flows through the stator coil 5 to rotate the rotor, and the operation of the fan motor is controlled accordingly.

A current flowing through the stator coil 5 differs depending upon the individual fan motor in use. Accordingly, it is difficult to evaluate a variation in the current over a long period of operation only by examining its effective value. Therefore, in the present embodiment, the current is detected, compared with that of steady state, and a variation in current is evaluated. The current detection circuit 4 is composed of a resistance element. A voltage drop in the current detection circuit 4 is transmitted into the current signal processing means 2-2 in the microcomputer 2 as a current signal.

Figure 2:
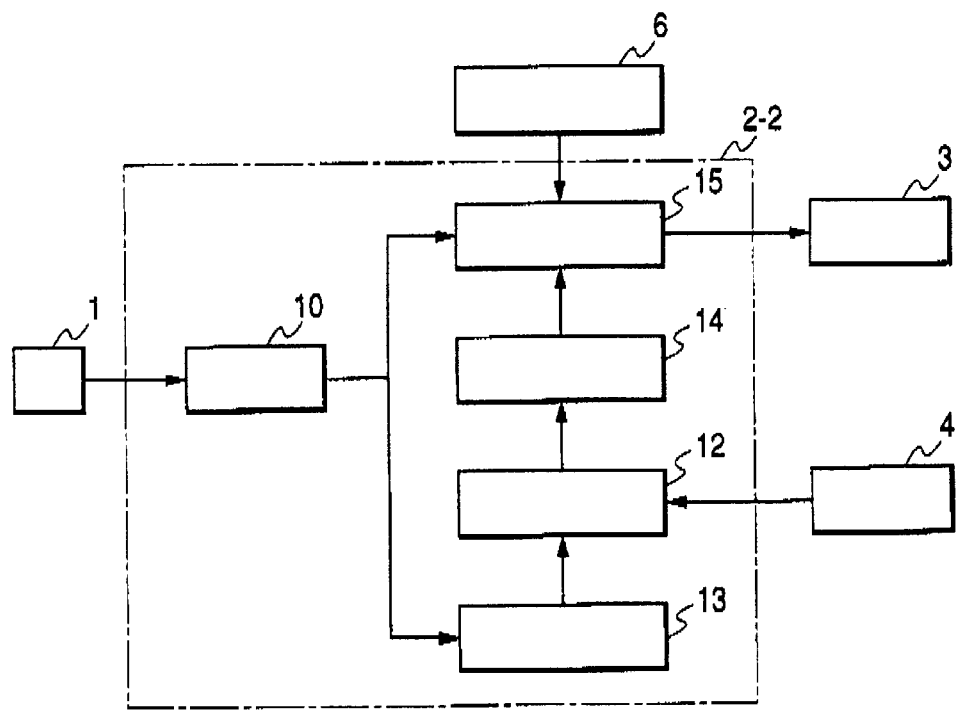
FIG. 2 is a block diagram of a current signal processing device of the control system shown in FIG. 1.

An exemplary construction of the current signal processing device 2-2 is shown in FIG. 2. In the drawing, 10 is a zero timing generator device that receives an output voltage of the Hall device 1 and generates zero timing signal, 12 is a sampling device, 13 is a timing signal generator device, 14 is an A/D converter device, 15 is a comparator device, 6 is the memory device, 3 is the current control circuit and 4 is the current detection circuit.

An exemplary operation of the current signal processing device 2-2 shown in FIG. 2 is described in greater detail hereinafter. An output voltage Vout (corresponding to a currently flowing current value in the stator coil 5) of the current detection circuit 4 is transmitted into the sampling device 12. The sampling device 12 samples the output voltage Vout in accordance with the timing signal transmitted from the timing signal generator device 13, and transmits the sampled output voltage Vout into the A/D converter device 14. The A/D converter device 14 transforms the sampled output voltage Vout into a digital value Ic. A zero timing of the sampling is determined by a zero timing signal transmitted from the zero timing generator device 10.

The digital value Ic corresponding to the instantaneous current value transmitted from the A/D converter device 14, a digital value Iref corresponding to the current value in the steady state stored in the memory device 6 and the zero timing signal transmitted from the zero timing generator device 10 are put into the comparator device 15.

The comparator device 15 compares the digital value Ic with the digital value Iref starting from the zero timing signal. If the difference between the digital value Ic and the digital value Iref is greater than a predetermined reference value E, then the comparator device 15 determines that the fan motor has exceeded its operating or service life and transmits a signal into the current control circuit 3 to stop the flow of current. Consequently, the fan motor is stopped. The current signal processing device 2-2 shown in FIG. 2 can be controlled with a control program prepared and stored before hand in the microcomputer 2.

Figure 3:
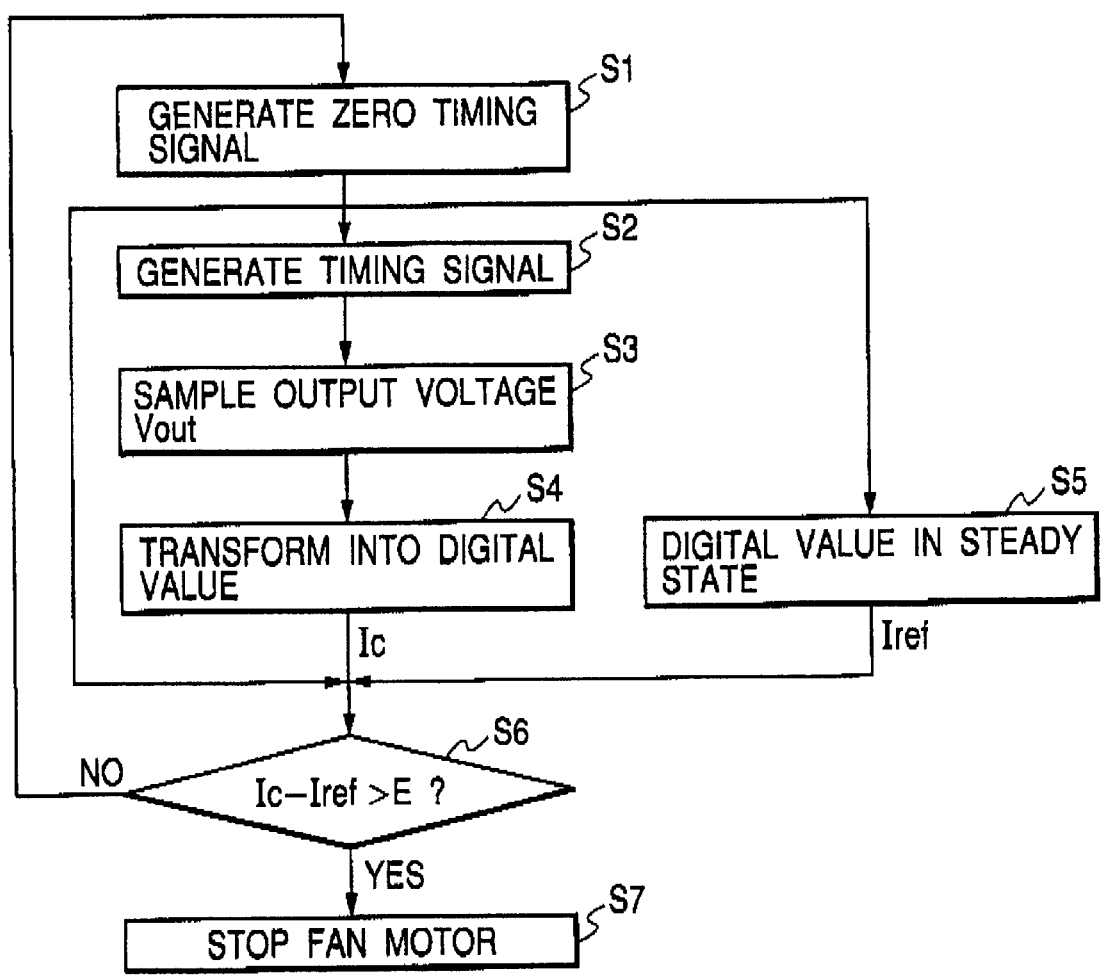
FIG. 3 is a flowchart of the current signal processing device shown in FIG. 2.

An exemplary process of the current signal processing device 2-2 is explained in greater detail hereinafter with reference to the flowchart shown in FIG. 3. The zero timing generator device 10 generates the zero timing signal synchronized with a signal from the Hall device 1. (S1) The timing signal generator device 13 receives the zero timing signal and generates the timing signal. (S2) The sampling device 12 receives the timing signal and samples the output voltage Vout of the current detection circuit 4. (S3) The A/D converter device 14 transforms the output voltage Vout, corresponding to the currently flowing current value, sampled by the sampling device 12, into the digital value Ic, and transmits the digital value Ic into the comparator device 15. (S4)

In addition, the digital value Iref corresponding to the current value in the steady state stored in the memory device 6 is transmitted into the comparator device 15, starting from the zero timing signal and synchronized with the timing signal from the timing signal generator device 13. (S5) The comparator device 15 compares the digital value Ic with the digital value Iref starting from the zero timing signal. If the difference between the digital value Ic and the digital value Iref is greater than the predetermined reference value E for determining service life, then the comparator device 15 determines if the fan motor has exceeded its service life and transmits a signal into the current control circuit 3 to stop current and the fan motor is stopped.

On the contrary, if the difference between the digital value Ic and the digital value Iref does not exceed the reference value E, then the procedure returns into initial step (S1) without transmitting the signal for stopping current into the current control circuit 3. (S6) Additionally, the reference value E for determining the service life of the fan motor should be set with a certain degree of allowance, since a current flowing through a stator coil differs in individual fan motor in use.

In the first embodiment of the fan motor according to the present invention as explained above, the instantaneous current value through the stator coil 5 is compared with the current value in steady state stored in the memory device 6. In case that the difference between the instantaneous current value and the current value in steady state is greater than a predetermined reference value E, the comparator device 15 judges that the fan motor has exceeded its service life and transmits a signal into the current control circuit 3 to stop current. Consequently, the fan motor is stopped. Accordingly, it is possible to replace the fan motor in operation before it wears out, and thus the service life of the electronic equipment in the casing in which the fan motor is installed can be lengthened.

Figure 4:
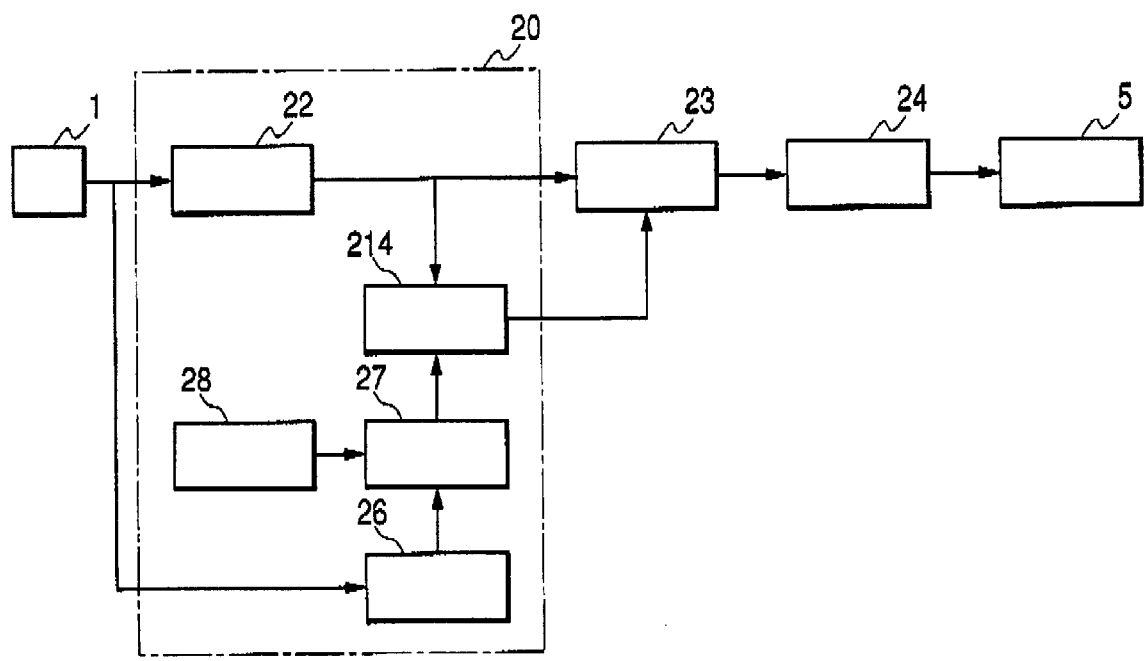
FIG. 4 is a block diagram of a control system of the second embodiment of the fan motor according to the present invention.

FIG. 4 is a block diagram of a control system of the second embodiment of the fan motor according to the present invention. In the drawing, 1 is a Hall device, 20 is a microcomputer, 22 is a control computer, 23 is a current control circuit that is a current control device, 24 is a current control switching circuit, 5 is a stator coil, 26 is a F/V converter device for transforming an output frequency of the Hall device into voltage, 27 is a comparator device, 28 is a reference voltage generator device and 214 is a drive control signal device.

In the control system shown in FIG. 4, an output signal of the Hall device 1 is transmitted into the control computer 22. This signal is transformed into a pulse signal and transmitted into the current control circuit 23. An output signal of the current control circuit 23 is transmitted into the current control switching circuit 24, and then into the stator coil 5 to rotate the rotor in a predetermined rotational speed in a predetermined rotational direction.

On the other hand, the output of the Hall device 1 is also transmitted into the F/V converter device 26, from which an output voltage Vc proportional to the rotational speed of the rotor is transmitted into the comparator device 27. In the comparator device 27, the output voltage Vc of the F/V converter device 26 is compared with a reference voltage Vref generated from the reference voltage generator device 28. If the output voltage Vc is lower than the reference voltage Vref, then an affirmation signal YES is transmitted into the drive control signal device 214. If the drive control signal device 214 receives the affirmation signal YES, and if the pulse signal is generated in the control computer 22, then the drive control signal device 214 transmits a continue drive command signal into the current control circuit 23.

On the contrary, if the output voltage Vc is equal to or higher than the reference voltage Vref, then an affirmation signal YES is not transmitted into the drive control signal device 214. Accordingly, the continue drive command signal is not transmitted from the drive control signal device 214, and the fan motor is decelerated. When the output voltage Vc of the F/V converter device 26 becomes lower than the reference voltage Vref again, the continue drive command signal is transmitted from the comparator device 27 into the current control circuit 23, and the fan motor is controlled to return into normal operation.

Composing elements, such as the control computer 22, the F/V converter device 26, the comparator device 27, the reference voltage generator device 28 and the drive control signal device 214, used to carry out the above procedure can be included in the microcomputer 20, and the procedure can be operated by a computer program loaded in the microcomputer 20.

Figure 5:
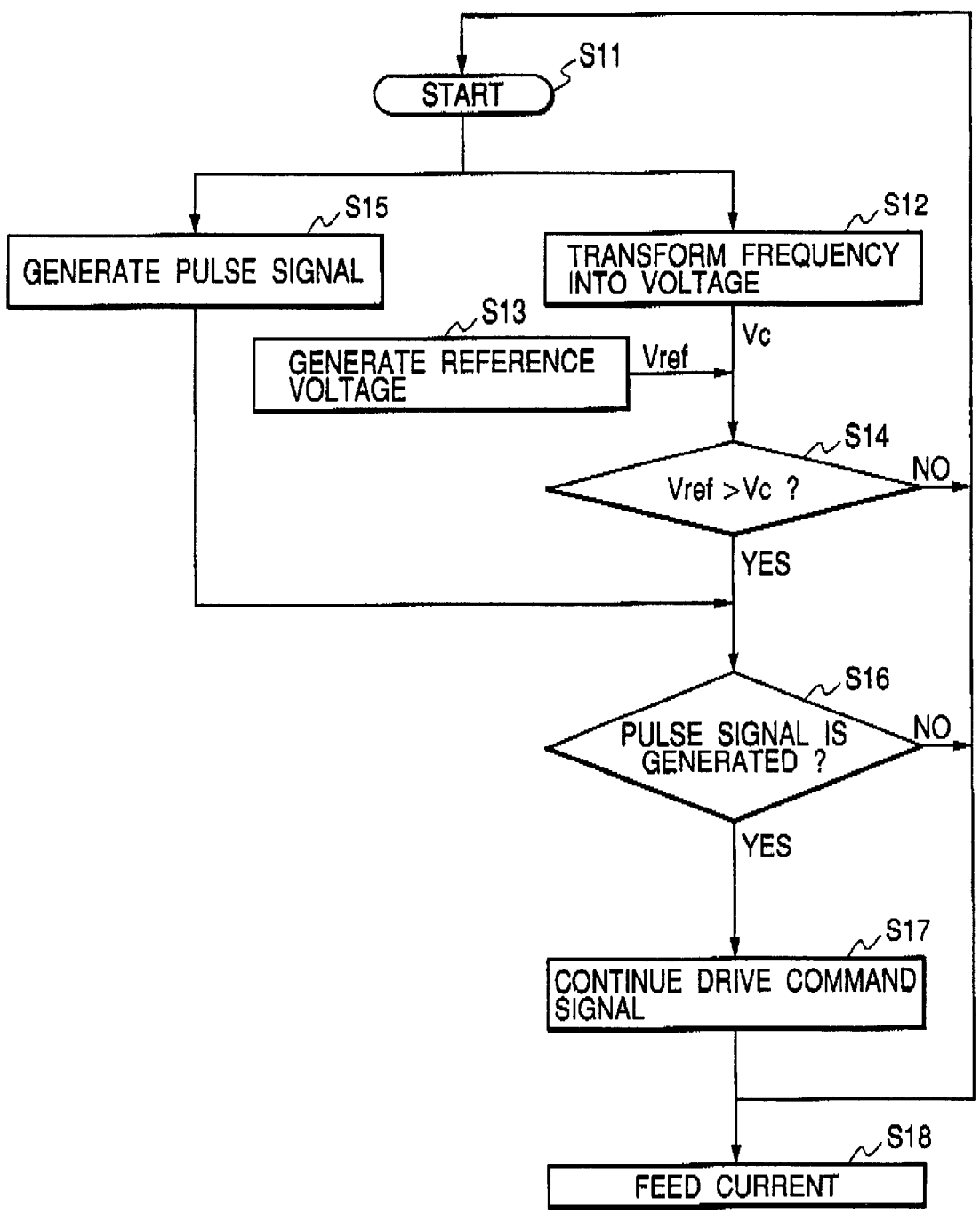
FIG. 5 is a flowchart of the microcomputer shown in FIG. 4.

FIG. 5 is a flowchart of the microcomputer 20. With the rotation of the fan motor, a voltage is generated in the Hall device 1. The control computer 22 receives the voltage generated in the Hall device 1 and generate a pulse signal. (S15) This pulse signal is transmitted into the drive control signal device 214. The output voltage of the Hall device 1 is also transmitted into the F/V converter device 26. The F/V converter device 26 transforms the frequency of the wave form of the output voltage into the voltage Vc proportional to the rotational speed of the fan motor. (S12)

The reference voltage generator device 28 generates the reference voltage Vref. (S13) The comparator device 27 compares the voltage Vc with the reference voltage Vref. If the voltage Vc is lower than the reference voltage Vref, the comparator device 27 transmits the affirmation output YES into the drive control signal device 214. (S14) If the pulse signal is transmitted from the control computer 22 is ascertained. (S16) If the pulse signal is transmitted from the control computer 22, and if the affirmation output YES is transmitted from the comparator device 27, the drive control signal device 214 transmits the continue drive command signal into the current control circuit 23. (S17) As a result, a current feed signal is transmitted from the current control circuit 23 into the current control switching circuit 24, current is fed to the stator coil 5 and the rotor of the fan motor continues to rotate. (S18)

After that, the flow returns to the start S11 and the process is repeated. In case that the rotational speed rises during the operation of the fan motor, and the output voltage Vc of the F/V converter device 26 becomes equal to or higher than the reference voltage Vref, then the comparator device 27 selects a denial output NO. If it is the case, no output signal is transmitted into the drive control signal device 214. Accordingly, since the continue drive command signal is not transmitted from the drive control signal device 214 into current control circuit 23, the current control circuit 23 stops to transmit the current feed signal into a semiconductor device in the current control switching circuit 24. Consequently, the current into the stator coil 5 is interrupted, the rotor is not driven and the fan motor is decelerated. The execution returns to the start S11 and the process is repeated.

If the current into stator coil 5 is interrupted and the rotor is decelerated, the output voltage Vc from the F/V converter device 26 is lowered. Comparing the output voltage Vc with the reference voltage Vref in the comparator device 27, if the output voltage Vc becomes less than the reference voltage Vref, the comparator device 27 again selects the affirmation signal YES and transmits it into the drive control signal device 214. Then, the continue drive command signal is transmitted from the drive control signal device 214 into the current control circuit 23, a normal current control signal is transmitted from the current control signal generate circuit 23 into the current control switching circuit 24, a normal current is fed to the stator coil 5 and the fan motor returns automatically into normal operation state.

Additionally, the reference voltage Vref is determined such that a rotational speed of the fan motor remains within a range in which a voltage, caused by a back electromotive force in the stator coil 5 and applied to a semiconductor control device of the current control switching circuit 24, does not exceed the voltage capacity of the semiconductor control device. Thus, the rotational speed can be reduced before the semiconductor control device is destroyed by the back electromotive force in the stator coil, and an accident can be prevented from occurring.

In the second embodiment of the fan motor according to the present invention as explained above, the fan motor is provided with an automatic return function by which, if the voltage Vc, obtained by transforming the output signal of the Hall device 1 by the F/V converter device 26, and proportional to the rotational speed of the fan motor, exceeds the reference voltage Vref, then the current fed to the stator coil 5 is interrupted to decelerate the fan motor, and if the voltage Vc becomes equal to or less than reference voltage Vref, then feeding of the current to the stator coil 5 is restarted to return the fan motor into normal operation.

Accordingly, it is possible to prevent such an accident in which semiconductor device in the current control circuit is destroyed when the rotational speed of the fan motor becomes higher than an allowable value.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fan motor comprising:
   a stator on which a stator coil is mounted;
   a rotor comprising a permanent magnet and a fan and being rotatably supported to oppose said stator coil;
   a Hall device for detecting a magnetic pole position of said permanent magnet;
   current control means for controlling rotation of said rotor by controlling current to be fed to said stator coil; and
   self-diagnosis means for detecting the state of said fan motor, wherein an operation of said fan motor is controlled through said current control means based on a result from said self diagnosis means, wherein said self-diagnosis means includes
      a current detection circuit for detecting an instantaneous current value in said stator coil,
      current signal processing means for processing said instantaneous current value, and
      memory means for processing and storing a steady state current value, said instantaneous current value being compared with said steady state current value for determining if said fan motor has exceeded a service life of said fan motor if a difference between said instantaneous current value and said steady state current value exceeds a predetermined value, wherein said current signal processing means further includes
      zero timing generator means for receiving an output voltage from said Hall device and for generating a zero timing signal,
      timing signal generator means for receiving said zero timing signal and for generating a timing signal,
      sampling means for receiving said timing signal and for sampling said currently flowing current value,
      A/D converter means for transforming said sampled currently flowing current value into a digital value, and
      comparator means for comparing, at any time starting from receipt of said zero timing signal, said digital value of said instantaneous current value with a digital value of said steady state current value stored in said memory device, and said fan motor is determined to have exceeded the service life if the difference between said digital value of said instantaneous current value and said digital value of said steady state current value exceeds the predetermined value.

2. The fan motor according to claim 1, wherein said current signal processing means is operated by a program loaded in a microcomputer.

3. A fan motor comprising:
   a stator on which a stator coil is mounted;
   a rotor including a permanent magnet and a fan and being rotatably supported to oppose said stator coil;
   a Hall device for detecting a magnetic pole position of said permanent magnet;
   current control means for controlling rotation of said rotor by controlling current fed to said stator coil; and
   self-diagnosis means for detecting the state of said fan motor, wherein an operation of said fan motor is controlled through said current control means based upon a result of said self-diagnosis means, wherein said self-diagnosis means further includes
      reference voltage generator means for generating a predetermined reference voltage,
      F/V converter means for transforming a rotational speed detected by use of an output voltage of said Hall device into a voltage proportional to said rotational speed, and
      comparator means for comparing said reference voltage with said voltage proportional to said rotational speed, wherein said current fed to said stator coil is interrupted when said voltage proportional to said rotational speed is higher than said reference voltage, and said current fed to said stator coil is cut-off and automatically restarted to return said fan motor into normal operation when said voltage proportional to said rotational speed is less than or equal to said reference voltage.

4. The fan motor according to claim 3, wherein said self-diagnosis means is contained in a microcomputer, and is operated by a program loaded in said microcomputer.

* * * * *